(12) United States Patent
Jokela

(10) Patent No.: US 6,300,690 B1
(45) Date of Patent: Oct. 9, 2001

(54) APPARATUS WHICH IS ELECTRONICALLY SWITCHED ON AND OFF

(75) Inventor: Harri U. Jokela, Savigne l'Eveque (FR)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/491,653

(22) Filed: Jan. 27, 2000

(30) Foreign Application Priority Data

Jan. 29, 1999 (EP) .................................................. 99400213

(51) Int. Cl.[7] ....................................................... H02J 9/00
(52) U.S. Cl. .............................................................. 307/64
(58) Field of Search ................................. 307/64, 86, 87, 307/66

(56) References Cited

U.S. PATENT DOCUMENTS 5,055,703 * 10/1991 Schornack ............................ 307/64
5,404,578    4/1995 Kuge et al. ............................ 455/73
5,551,007 *  8/1996 Oda ..................................... 455/343

* cited by examiner

Primary Examiner—Edward H. Tso
(74) Attorney, Agent, or Firm—Dicran Halajian

(57) ABSTRACT

An apparatus, such as a mobile phone for example, is electronically switched on in the following manner. A power-on circuit (POC) initially provides a power-on signal (POS). A power supply (PWS) derives a power supply voltage (VCC) from an electrical power source (EPS) in response to the power-on signal (POS). A feedback path (FBP) upholds the power-on signal (POS) on the basis of the power supply voltage (VCC). There is a risk that the apparatus is switched off unintentionally when the electrical power source (EPS), a battery for example, is temporarily disconnected from the power supply (PWS) for a relatively short time, for example due to a shock or a vibration. In order to reduce this risk, the feedback path (FPB) comprises a hold circuit (HOLD) for upholding the power-on signal (POS) for a least a period of time (Thold) following a drop (DRP) in the power supply voltage (VCC).

3 Claims, 3 Drawing Sheets

APPARATUS WHICH IS ELECTRONICALLY SWITCHED ON AND OFF

The invention relates to an apparatus which is electronically switched on and off. The invention may be applied, for example, in a mobile phone which can be switched on and off by depressing a power key.

An apparatus can be electronically switched on in the following manner. A power-on circuit initially provides a power-on signal. A power supply derives a power supply voltage from an electrical power source in response to the power-on signal. A feedback path upholds the power-on signal on the basis of the power supply voltage. It seems that U.S. Pat. No. 5,404,578 describes a car telephone is switched on in this manner.

It is an object of the invention to provide better user satisfaction. The invention takes the following aspects into consideration. In an apparatus as described in the preceding section, the following problem may occur. It may happen that the electrical power source is temporarily disconnected from the power supply, for example, due to a shock or a vibration. Such an event will hereinafter be referred to as a power cut. A power cut will cause a drop in the power supply voltage. Since the feedback path upholds the power-on signal on the basis of the power voltage, a power cut may cause the power-on signal to be lost. In that case, the power supply will not provide the power supply voltage once the power cut has ended, because there is no power-on signal any more. Thus, the apparatus is unintentionally switched off as a result of the power cut. This will generally annoy a user. It will particularly annoy a user, for example, when the apparatus is a mobile phone which the user carries in his pocket. If the mobile phone is switched off unintentionally, the user cannot be reached via his mobile phone whereas he or she is unaware of this.

In accordance with the invention, the feedback path for upholding the power-on signal on the basis of the power supply voltage, comprises a hold circuit for upholding the power-on signal for a least a period of time following a drop in the power supply voltage. Accordingly, in the case of a relatively short power cut, the power supply will still receive the power-on signal once the power cut has ended. As a result, the apparatus will automatically be switched on once the power cut has ended. Consequently, the invention prevents that, in the case of a relatively short power cut, the apparatus is switched off unintentionally. Thus, the invention provides more user satisfaction.

Another advantage of the invention relates to the following aspects. In principle, it is possible to prevent an unintentional switch-off by coupling a capacitor between the output of power supply which provides the power supply voltage, and signal ground. Such a power supply capacitor will delay, in effect, a drop in the power supply voltage as a result of a power cut. Accordingly, the feedback path will continue to uphold the power-on signal for a certain period of time. However, since the power supply capacitor will be discharged by power-consuming circuitry, it needs to have a relatively high capacitance value in order to sufficiently delay a drop in the power supply voltage. Since, according to the invention, the hold circuit upholds the power-on signal following a drop in the power supply voltage, there is no need to delay the drop. Consequently, any power supply capacitor need not have a relatively large capacitance value. It generally holds that the smaller the capacitance value of a capacitor, the cheaper and the smaller the capacitor is. Thus, the invention is advantageous in terms of size and cost.

These and other aspects of the invention are apparent from and will be elucidated with reference to the drawings described hereinafter.

FIG. 1 is a conceptual diagram illustrating basic characteristics of the invention as claimed in claim 1;

FIGS. 2 and 3 are conceptual diagrams illustrating additional characteristics as claimed in claims 2 and 3, respectively;

First, some remarks will be made on the use of reference signs. Similar entities are denoted by an identical letter code throughout the drawings. Various similar entities may be shown in a single drawing. In that case, a numeral is added to the letter code so as to distinguish similar entities from each other. The numeral will be in parentheses if the number of similar entities is a running parameter. In the description and the claims, any numeral in a reference sign may be omitted where appropriate.

Figure 1:
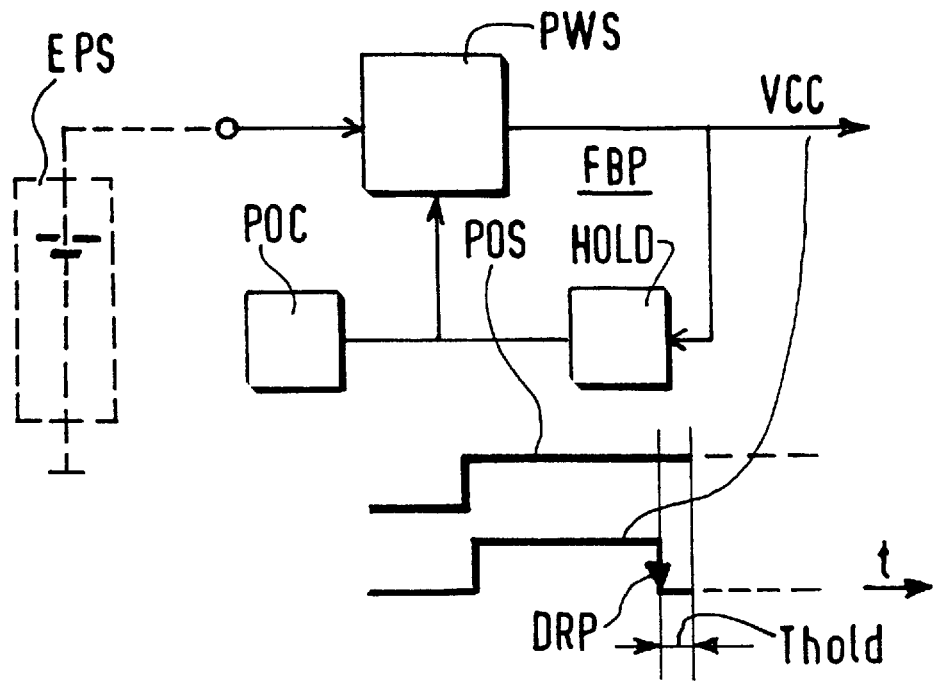

FIG. 1 illustrates basic characteristics of the invention as summarized hereinbefore. An apparatus comprises a power-on circuit POC, a power supply PWS and a feedback path FBP. The power-on circuit POC initially provides a power-on signal POS. The power supply PWS derives a power supply voltage VCC from an electrical power source EPS in response to the power-on signal POS. The feedback path FBP upholds the power-on signal POS on the basis of the power supply voltage VCC. The feedback path FPB comprises a hold circuit HOLD for upholding the power-on signal POS for a least a period of time hold following a drop DRP in the power supply voltage VCC. As mentioned hereinbefore, the drop DRP may be due to a power cut, that is, a temporary disconnection of the power supply PWS from the electronic power source EPS.

To implement the characteristics illustrated in FIG. 1 in an advantageous manner, the following aspects have been taken into consideration. There are two events which may switch the apparatus on. That is, there are two events which may cause the power supply PWS to start providing the power supply voltage VCC. One event is that the power-on circuit POC has initially provided the power-on signal POS, for example, because a user has depressed a power key. This will be referred to as an intentional switch-on. The other event is that there has been a power cut which has caused the power supply voltage VCC to disappear while the hold circuit HOLD has upheld the power-on signal POS during the power cut. Consequently, at the end of the power cut, the power supply voltage VCC will re-appear again. This will be referred to as an unintentional switch-off-and-on.

When the apparatus is switched on, it will generally start carrying out one or more tasks. The tasks that need to be carried out following an intentional switch-on, need not fully correspond to the tasks that need to be carried out following an unintentional switch-off-and-on. For example, when an apparatus has intentionally been switched on, for example because a user has depressed a power key, it may be convenient to display a welcome message. However, it may be annoying to the user if such a welcome message is displayed following an unintentional switch-off-and-on, that is, following a power cut. Rather, it would be preferable if the apparatus were to automatically resume the tasks that were interrupted due to the power cut.

Figure 2:
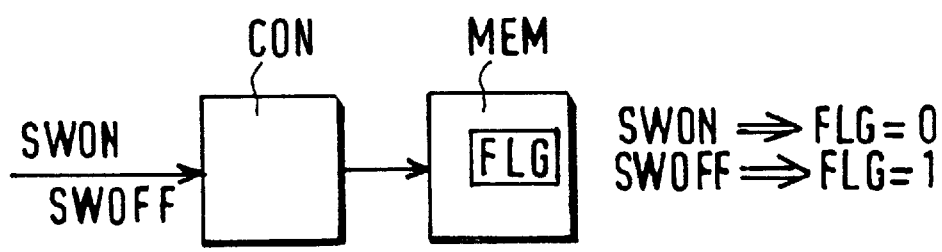

FIG. 2 illustrates the following characteristics which may be optionally applied in addition to the characteristics illustrated in FIG. 1. A power-on/off flag FLG is stored in a non-volatile memory MEM. A controller CON gives the power-on/off flag FLG a power-on value 0 in response to a switch-on command SWON. The controller CON gives the power on/off flag FLG a power-off value 1 in response to a switch-off command SWOFF.

The characteristics illustrated in FIG. 2 provide the following advantageous effects. The power-on/off flag FLG provides the apparatus an indication whether it has intentionally been switched on, or whether it has unintentionally been switched-off-and-on as a result of a power cut. Consequently, once the apparatus has been switched on, it can carry out one task or another depending on whether the switch-on was intentional or not. For example, if the apparatus has been switched on while the power-on/off flag FLG has the power-on value 0, the apparatus can deduce from this that there has been a power cut. Thus, a welcome message should not be displayed. Rather, the apparatus should resume the tasks that were aborted by the power cut, if possible. Thus, the characteristics illustrated in FIG. 2 allow yet more user satisfaction.

To implement the characteristics illustrated in FIG. 1 in an advantageous manner, the following aspects have also been taken into consideration. There is a problem that, after a power cut, the apparatus may be in an undefined, unforeseen state. For example, let it be assumed that the power supply voltage VCC is supplied to a volatile memory for storing control parameters. A power cut may cause the power supply voltage VCC to disappear temporarily, as a result of which the control parameters may be lost.

A solution to the aforementioned problem is to always reset the apparatus after a power cut. That is, the apparatus is always brought to an initial state after a power cut. However, if this is done, this may require some time and one or more user interventions in order to bring the apparatus to a desired state, for example, the state the apparatus was in just before the power cut.

Figure 3:
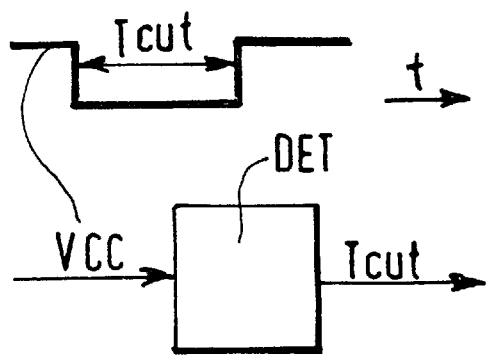

FIG. 3 illustrates the following characteristics which may be optionally applied in addition to the characteristics shown in FIG. 1. A detector DET detects a period of time Tcut during which the power supply voltage VCC was absent. This detection allows a decision whether the apparatus should be reset after a power cut or not. For example, let it be assumed that the apparatus comprises a volatile memory for storing control parameters. The control parameters may not be lost, for example, if the power supply voltage VCC was absent for no more than 100 microseconds. Thus, in that case, the volatile memory need not be re-initialized. To give another example, let it be assumed that the apparatus is a mobile phone communicating with a base station in accordance with the standard commonly referred to as AMPS. In accordance with the AMPS standard, the base station will abort the communication if the mobile phone has not transmitted a radio signal for more than ten seconds. Thus, if the power supply voltage VCC has been absent a few seconds only or less, a communication need not be re-established. In short, the characteristics illustrated in FIG. 3 allow a recovery from a power cut that is faster and more user-friendly than a standard reset as mentioned hereinbefore. Thus, the characteristics illustrated in FIG. 3 provide yet more user satisfaction.

Figure 4:
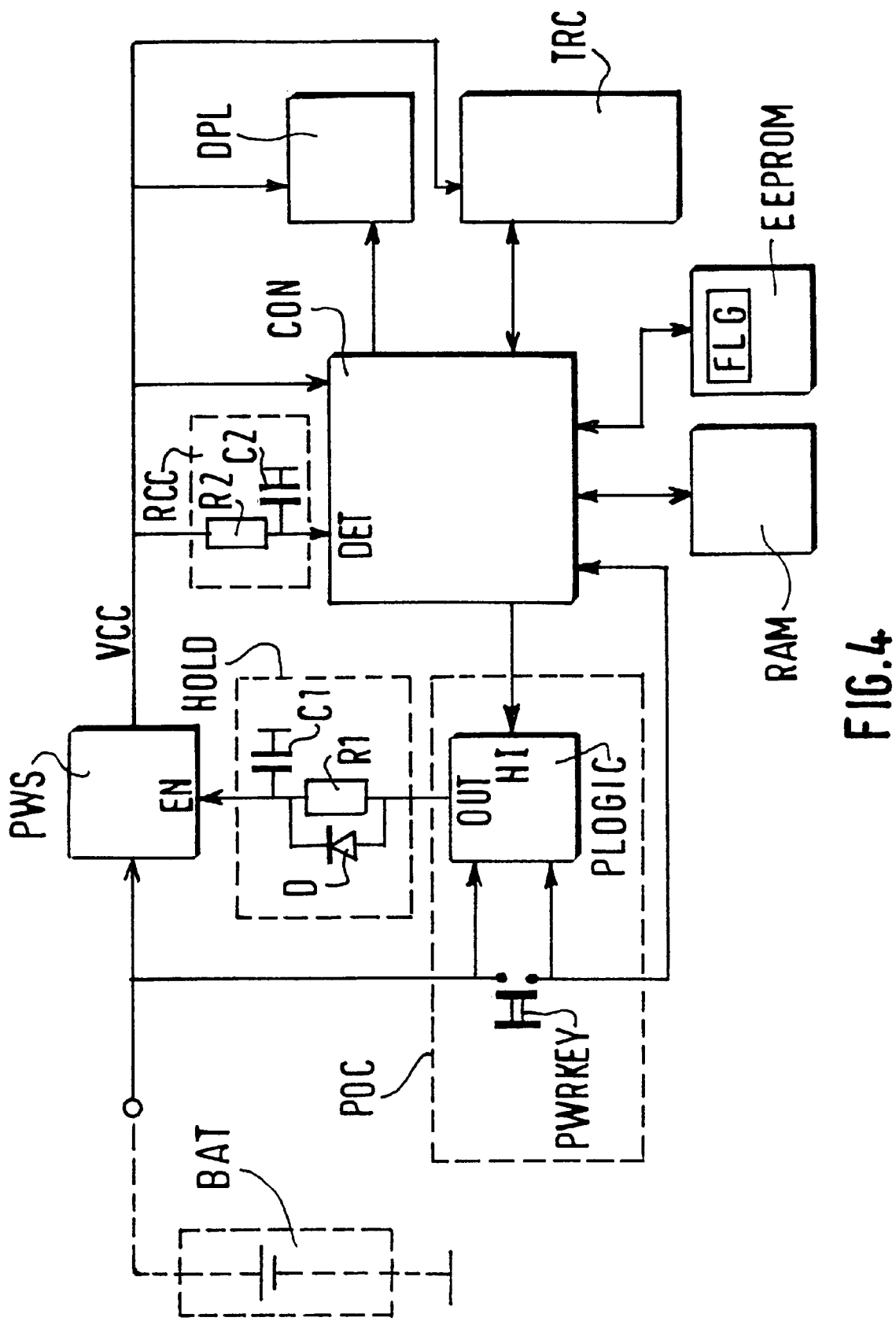
FIG. 4 is a block diagram illustrating an example of a mobile phone in accordance with the invention.

FIG. 4 illustrates an example of a mobile phone which recaptures the characteristics illustrated in FIGS. 1 to 3. The mobile phone comprises the following main parts: a power-on circuit POC, a power supply PWS, a hold circuit HOLD, an RC circuit RCC, a controller CON, a volatile memory RAM, a non-volatile memory EEPROM, a display DPL, and a transceiver circuit TRC. A battery BAT is additionally shown in a broken line. In more detail, the power-on circuit POC comprises a power key PWRKEY and power-on logic PLOGIC. The hold circuit HOLD comprises a resistor R1, a capacitor C1 and a diode D1. The hold circuit is, in effect, a fast attack and slow decay circuit. The RC circuit RCC comprises a resistor R2 and a capacitor C2.

The mobile phone illustrated in FIG. 4 is switched on in the following manner. If the power key PWRKEY is depressed, the power-on logic PLOGIC provides a high-level voltage at an output OUT. The high-level voltage is supplied to an enable input EN of the power supply PWS via the hold circuit HOLD. Since the diode D will be conducting when the high-level voltage appears, causing the resistor R1 to be short-circuited, the enable input EN receives the high-level voltage without any substantial delay. In response, the power supply PWS provides a power supply voltage VCC which is supplied to the controller CON. In response, the controller CON supplies a logic 1 to a hold input HI of the power-on logic PLOGIC. In response, the power-on logic PLOGIC upholds the high-level voltage at the output OUT. For that purpose, it is not necessary for the power key PWRKEY to remain depressed. Thus, the power supply circuit PWS continues to provide the power supply voltage VCC, so that the apparatus is switched on.

The mobile phone can be switched off by depressing the power key PWRKEY once more. In response, the controller CON will supply a logic 0 instead of a logic 1 to the hold input HI of the power-on logic PLOGIC. In response, the power-on logic PLOGIC will no longer provide the high-level voltage at the output OUT. As a result, the voltage at the enable input EN of the power supply PWS will decrease. When, after a certain time, the voltage has dropped below a critical level, the power supply PWS will no longer provide the power supply voltage VCC, so that the mobile phone is switched off.

Let it be assumed that the battery BAT is temporarily disconnected from the power supply PWS, for example, due to a shock or a vibration. When the battery BAT is disconnected, the high-level voltage at the output OUT of the power-on logic PLOGIC will disappear. Nevertheless, the hold circuit HOLD will maintain the voltage at the enable input EN of the power supply PWS, above the critical level for a certain period of time. Thus, if the voltage at the enable input EN is still above the critical level when the battery BAT is reconnected to the power supply PWS, the power supply voltage VCC will reappear. In response, the logic 1 will reappear at the hold input HI of the power-on logic PLOGIC and, as a result, the high-level voltage will reappear at the output OUT and, consequently, it will reappear at the enable input EN of the power supply PWS. Thus, the apparatus is automatically switched on without this requiring a user intervention in the form of a depression of the power key PWRKEY.

Figure 5:
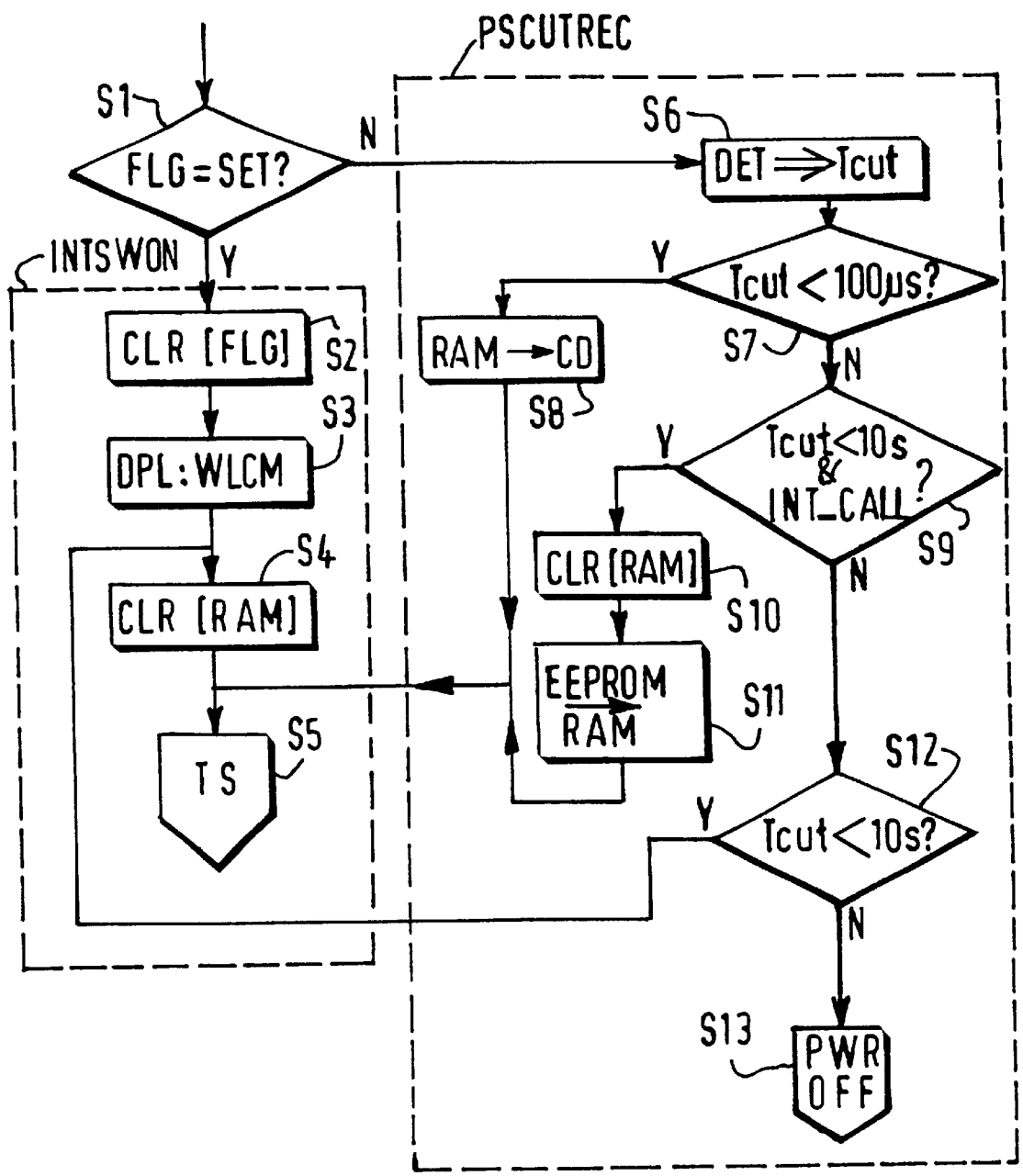
FIG. 5 is a flow chart illustrating a switch-on procedure of the mobile phone illustrated in FIG. 4

FIG. 5 illustrates a switch-on procedure for the mobile phone illustrated in FIG. 4. This procedure is applied when the power supply voltage VCC appears either because the mobile phone is switched on intentionally, or because the mobile phone has been switched off and on unintentionally.

In a first step S1, the controller CON reads a power-off flag FLG stored in the non-volatile memory EEPROM, and checks if the power-off flag FLG has been set (FLG=SET?). If the power-off flag FLG has been set, the controller CON concludes, as it were, that the mobile phone was switched off intentionally. In that case, the controller CON carries out steps belonging to an intentional switch-on sub-procedure INTSWON. However, if the power-off flag FLG has not been set, the controller CON concludes, as it were, that the mobile phone was switched off and on unintentionally. In that case, the controller CON carries out steps belonging to a power cut recovery sub-procedure PSCUTREC.

The intentional switch-on sub-procedure INTSWON comprises a series of four step S2–S5. In step S2, the controller CON clears the power-off flag FLG (CLR[FLG]), that is, it resets the power-off flag FLG. In step S3, the controller CON causes the display DPL to display a welcome message (DPL:WLCM). In step S4, the controller CON clears the volatile memory RAM (CLR[RAM]) and writes initial control data, if any, into the volatile memory RAM. In step S5, the controller CON carries out further tasks in accordance with a task scheduler (TS). The task scheduler is a software program for controlling various functional elements like, for example, the transceiver circuit TRC.

The power cut recovery sub-procedure PSCUTREC comprises eight steps S6–S13. In step S6, the controller CON calculates a duration of the power cut Tcut in the following manner. The controller CON has a detection input DET, shown in FIG. 4, which receives the power supply voltage VCC via the RC circuit RCC. The controller CON measures the voltage at the detection input DET, for example by means of an A/D converter. The voltage is determined by the power supply voltage VCC, the time constant of the RC circuit RCC, and the duration of the power cut Tcut. Since the power supply voltage VCC and the time constant are sufficiently known, the controller CON can derive the duration of the power cut Tcut from the voltage measured at the detection input DET (DET⇒Tcut).

In step S7, the controller CON checks whether the power cut duration Tcut was less than 100 microseconds or not (Tcut<100 $\mu$s?). If so, the controller CON concludes, as it were, that any control data stored in the volatile memory RAM is still valid, and carries out step S8. In step S8, the controller CON uses the control data stores in the RAM to control the transceiver circuit TRC and any other functional element (RAM→CD). Following step S8, the controller CON carries out step S5 which means that it further executes tasks as defined by the task scheduler. That is, it resumes the tasks that have been interrupted as a result of the relatively short power cut. If, in step S7, the controller CON finds out that the duration of the power cut Tcut was more than 100 microseconds, it concludes, as it were, that the control data stored in the volatile memory RAM is not valid and proceeds to carry out step S9.

In step S9, the controller CON checks whether the duration of the power cut Tcut was less than 10 seconds, and whether the power cut occurred during a telephone call (Tcut<10s & INT_CALL?). If twice so, the controller CON concludes as it were, that the telephone call can be continued because the base station has not yet terminated the telephone call. Accordingly, the controller CON carries out steps S10 and S11. In step S10, the volatile memory RAM is cleared (CLR[RAM]). It is assumed that, when a telephone call is established, control data relating to that telephone call, such as channel number data, for example, is stored in the non-volatile memory EEPROM. In step S11, the controller writes new control data in the volatile memory RAM on the basis of the control data in the non-volatile memory EEPROM (EEPROM→RAM). Following step S11, the controller CON carries out step S5 which means that it further executes tasks as defined by the task scheduler. If, in step S9, the controller CON finds out that the duration of power cut Tcut was more than 10 seconds, or that the power cut has not interrupted a telephone call, it subsequently carries out step S12.

In step S12 the controller CON checks whether the duration of the power cut Tcut was less than 10 seconds (Tcut<10s?). If so, the controller CON concludes as it were that the power cut was unintentional, that is, that the power cut was not due to a user intervention. Accordingly, the controller CON proceeds to carry out step S4 and any following steps. That is, the controller CON clears the volatile memory RAM and, subsequently, starts to carry out tasks in accordance with the task scheduler. If, in step S12, the controller CON finds out that the duration of the power cut Tcut was at least 10 seconds, it subsequently carries out step S13. In step S13 is carries out a power-off procedure (PWROFF), which will be discussed in greater detail hereinafter. It should be noted that if the duration of the power cut Tcut is more 10 seconds, the power cut has probably been caused by a user. For example, the user might have taken out the battery BAT and waited for more than 10 seconds to place the battery BAT in the mobile phone again.

Figure 6:
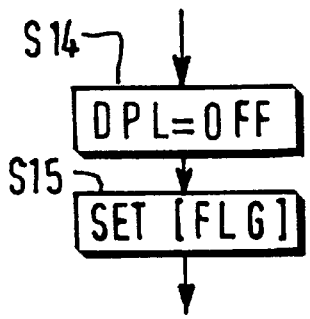
FIG. 6 is a flow chart illustrating a switch-off procedure of the mobile phone illustrated in FIG. 4.

FIG. 6 illustrates a switch-off procedure for the mobile phone illustrated in FIG. 4. The switch-off procedure is applied when the apparatus is switched off intentionally, for example because a user has depressed the power key PWR-KEY while the mobile phone was on. The switch-off procedure is also applied following step S13 in the procedure, which has been described hereinbefore with reference to FIG. 5.

In step S14, the controller CON de-activates the display DPL (DPL=OFF) and any further indicators to give the user the impression that the mobile phone has effectively been switched off. In this respect it is recalled that the power supply voltage VCC disappears only a certain delay after the power key PWRKEY has been depressed. In step S15, the controller CON sets the power-off flag FLG in the non-volatile memory EEPROM (SET[FLG]). The power-off flag FLG being set, this indicates that the mobile phone has been switched off intentionally.

The drawings and their description hereinbefore illustrate rather than limit the invention. It will be evident that there are numerous alternatives which fall within the scope of the appended claims. In this respect, the following closing remarks are made.

Referring to FIGS. 1 and 4, the power supply PWS may be any type of circuit that provides or does not provide a power supply voltage, depending on whether a power-on signal is present or not. In its simplest form, the power supply PWS may be an electronically controlled switch. In a more sophisticated form, the power supply PWS may be a power supply circuit that derives a stabilized power supply voltage from an electrical power source with an unstabilized voltage.

There are numerous ways of physically spreading functions or functional elements over various units. In this respect, the drawings are very diagrammatic, each representing only one possible embodiment of the invention. Thus, although a drawing shows different functional elements as different blocks, this by no means excludes that some functional elements, or all functional elements, may be implemented as a single physical unit.

Any reference sign in a claim should not be construed as limiting the claim.

What is claimed is:

1. An apparatus comprising:
   a power-on circuit (POC) for initially providing a power-on signal (POS);
   a power supply (PWS) for deriving a power supply voltage (VCC) from an electrical power source (EPS) in response to the power-on signal (POS); and a feedback path (FBP) for upholding the power-on signal (POS) on the basis of the power supply voltage (VCC); characterized in that the feedback path (FPB) comprises a hold circuit (HOLD) for upholding the power-on signal (POS) for a least a period of time (Thold) following a drop (DRP) in the power supply voltage (VCC).

2. An apparatus as claimed in claim 1, characterized in that it comprises:

a non-volatile memory (MEM) for storing a power-on/off flag (FLG); and a controller (CON) for giving the power-on/off flag (FLG) a power-on value (0) in response to a switch-on command (SWON), and for giving the power on/off flag (FLG) a power-off value (1) in response to a switch-off command (SWOFF).

3. An apparatus as claimed in claim 1, characterized in that it comprises:

a detector (DET) for detecting a period of time (Tcut) during which the power supply voltage (VCC) was absent.

* * * * *